US012394371B2

(12) United States Patent
Kung et al.

(10) Patent No.: US 12,394,371 B2
(45) Date of Patent: Aug. 19, 2025

(54) RESET VOLTAGE CONTROL CIRCUIT

(71) Applicant: FocalTech Systems Co., Ltd., Zhubei (TW)

(72) Inventors: Chen-Pang Kung, Zhubei (TW); Wei-Chih Chang, Zhubei (TW)

(73) Assignee: FOCALTECH SYSTEMS CO., LTD., Zhubei (TW)

( * ) Notice: Subject to any disclaimer, the term of this patent is extended or adjusted under 35 U.S.C. 154(b) by 0 days.

(21) Appl. No.: 18/792,764

(22) Filed: Aug. 2, 2024

(65) Prior Publication Data

US 2025/0131876 A1 Apr. 24, 2025

(30) Foreign Application Priority Data

Oct. 20, 2023 (TW) ................................ 112140142

(51) Int. Cl.
*G09G 3/3225* (2016.01)
*G09G 3/20* (2006.01)

(52) U.S. Cl.
CPC ......... *G09G 3/3225* (2013.01); *G09G 3/2007* (2013.01); *G09G 2300/0819* (2013.01); *G09G 2320/0257* (2013.01); *G09G 2330/021* (2013.01); *G09G 2330/028* (2013.01)

(58) Field of Classification Search
CPC ............... G09G 3/3225; G09G 3/2007; G09G 2300/0819; G09G 2320/0257; G09G 2330/021; G09G 2330/028
See application file for complete search history.

(56) References Cited

U.S. PATENT DOCUMENTS

| | | | | |
|---|---|---|---|---|
| 2022/0358884 A1* | 11/2022 | Chae | .................... | G09G 3/3233 |
| 2023/0143180 A1* | 5/2023 | Song | .................... | G09G 3/2096 345/691 |
| 2024/0038123 A1* | 2/2024 | Sang | .................... | G09G 3/3233 |
| 2024/0161705 A1* | 5/2024 | Sang | .................... | G09G 3/3233 |
| 2024/0304144 A1* | 9/2024 | Sano | .................... | G09G 3/3291 |
| 2024/0347001 A1* | 10/2024 | Park | .................... | G09G 3/3233 |

* cited by examiner

*Primary Examiner* — Antonio Xavier
(74) *Attorney, Agent, or Firm* — Muncy, Geissler, Olds & Lowe, P.C.

(57) ABSTRACT

A reset voltage control circuit provides at least one reset voltage to an OLED panel. The OLED panel is driven to display at least one frame, and each frame has a plurality of pixels and corresponds to a reset voltage. The OLED panel performs OLED on state reset according to the reset voltage, wherein the reset voltage is dynamically generated according to the plurality of pixels of the frame.

15 Claims, 6 Drawing Sheets

RESET VOLTAGE CONTROL CIRCUIT

CROSS-REFERENCE TO RELATED APPLICATIONS

This application claims the benefits of the Taiwan Patent Application Serial Number 112140142, filed on Oct. 20, 2023, the subject matter of which is incorporated herein by reference.

BACKGROUND

Field of the Disclosure

The present disclosure relates to the technical field of organic light-emitting diodes and, more particularly, to an organic light-emitting diode reset voltage control circuit.

Description of Related Art

In driving an organic light-emitting diode (OLED) pixel circuit, it is likely to have charges accumulated in the transistors of the pixel circuit, and thus, after driving the pixel circuit, an additional reset transistor is generally required to apply a reset voltage to the reset transistor to turn on or off the current path of the pixel circuit, which is known as OLED on state reset. The OLED on state reset may eliminate the charges accumulated in the transistor to avoid affecting the display effect.

In order to illustrate the aforementioned OLED on state reset, FIG. 1 shows a prior OLED pixel circuit, wherein the aforementioned charge accumulation refers to, for example, the charges accumulated on the drain of the transistor T3 due to the hysteresis phenomenon of the transistor T3. In order to provide the OLED on state reset function, as shown in FIG. 1, a reset transistor T8 is added to the OLED pixel circuit and a reset voltage Vint3 is provided. By applying the reset voltage to the reset transistor T8, the reset transistor T8 may be turned on when the transistor T5 is turned off, so as to use the current flowing through the transistor T3 between the voltage ELVSS and the voltage Vint3 on the node N2 to wash away the charges on the drain.

In the existing OLED pixel circuit, the reset voltage Vint3 is a constant value, and the hysteresis phenomenon of the transistor T3 is highly related to the current flowing through transistor T3 and the gate-drain voltage Vgd of the transistor T3. Therefore, in order to fully remove the charges accumulated on the drain, the reset voltage Vint3 is generally provided with a fixed voltage close to or even higher than ELVDD, resulting in relatively high power consumption, while the heat generated by the high power consumption of the OLED panel will also affect the reliability and reliability of the thin film transistor (TFT) characteristics and the OLED material of the OLED panel.

Therefore, in the design of the prior OLED pixel circuit, there are still many deficiencies that need to be alleviated and/or obviated.

SUMMARY

An object of the present disclosure is to provide a reset voltage control circuit for achieving the purpose of reducing power consumption by dynamically adjusting the reset voltage.

To achieve the object, the present disclosure provides a reset voltage control circuit for providing at least one reset voltage to an organic light-emitting diode panel, the organic light-emitting diode panel being driven to display at least one frame, each frame having a plurality of pixels and corresponding to a reset voltage, the organic light-emitting diode panel performing an organic light-emitting diode on state reset according to the reset voltage, wherein the reset voltage is dynamically generated according to the plurality of pixels of the frame.

Other novel features of the disclosure will become more apparent from the following detailed description when taken in conjunction with the accompanying drawings.

DETAILED DESCRIPTION OF EMBODIMENT

The following embodiments describe the implementation and operation principles of the present disclosure. Those skilled in the art to which the present disclosure pertains may understand the features and effects of this disclosure through the aforementioned embodiments, and may perform combination, modification, replacement or adaption based on the spirit of the present disclosure.

Figure 1:
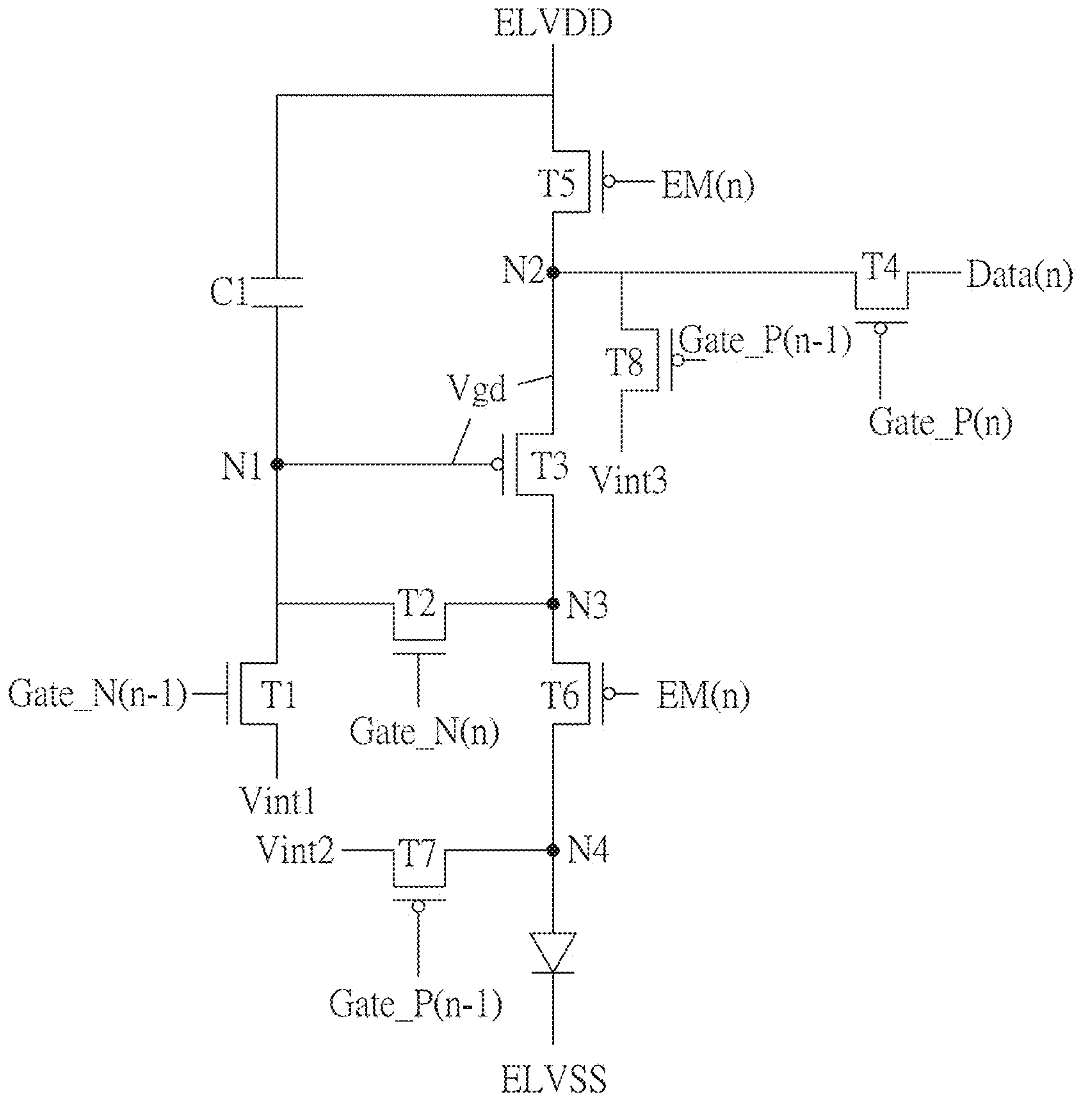
FIG. 1 (PRIOR ART)
FIG. 1 shows a prior OLED pixel circuit.
Figure 2A:
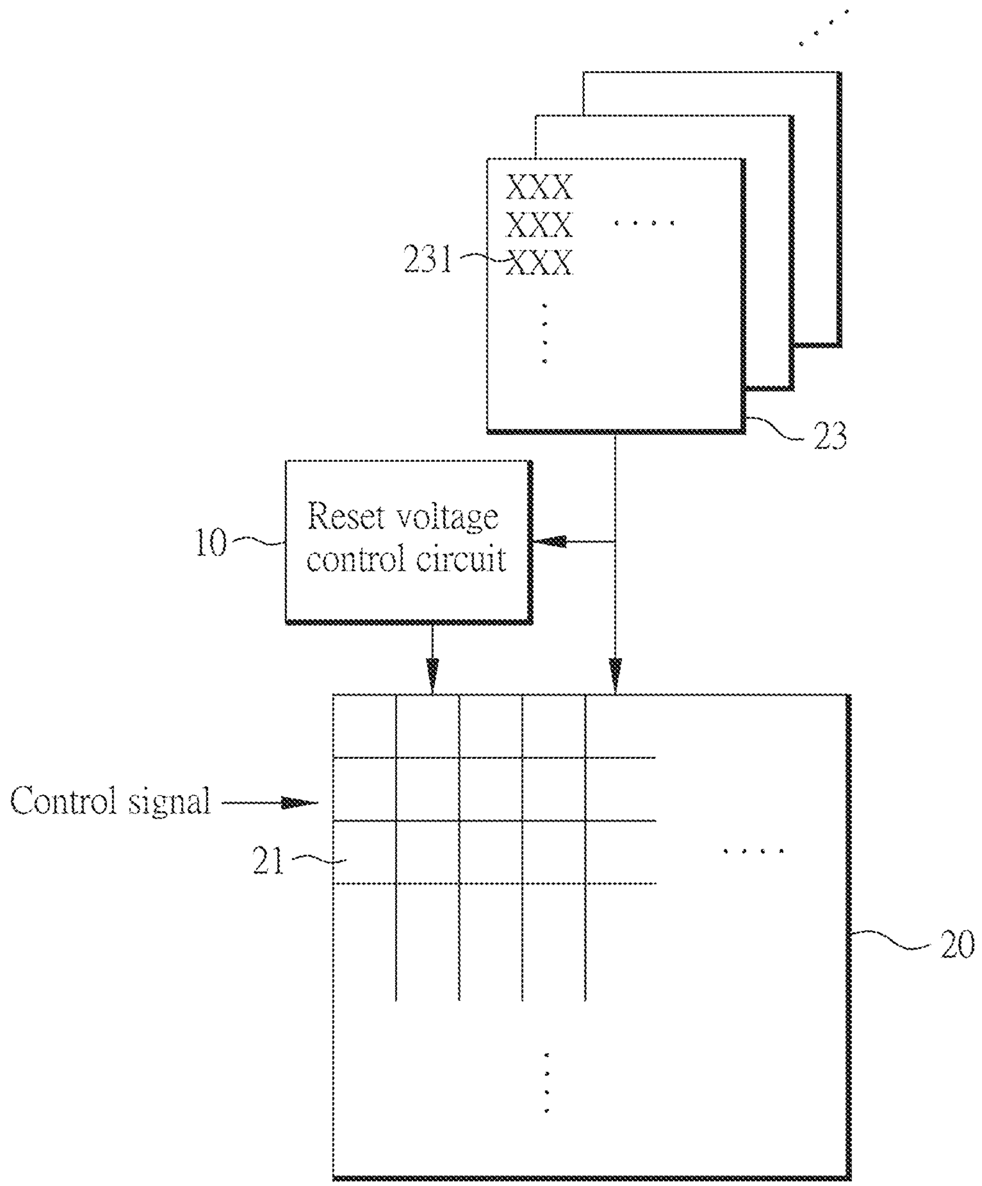
FIG. 2A schematically illustrates the driving display of the OLED panel using the reset voltage control circuit of the present disclosure.
Figure 2B:
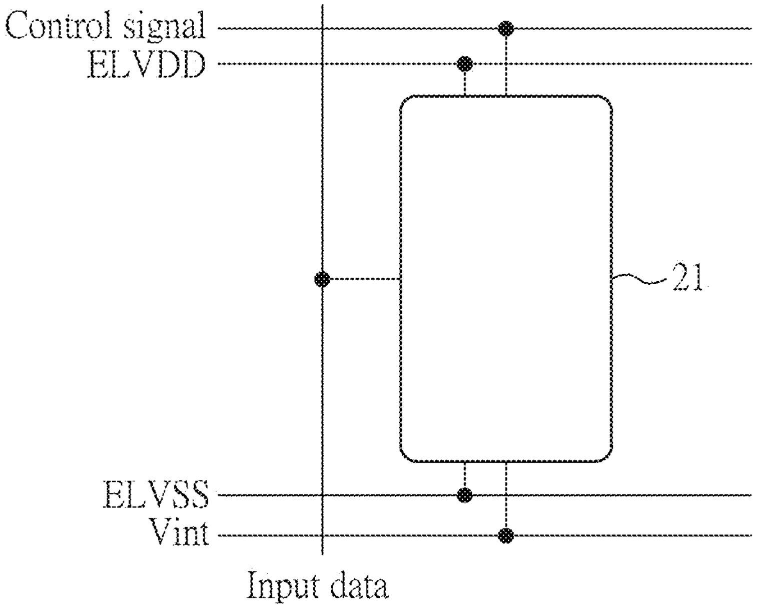
FIG. 2B is a schematic diagram illustrating the connection of one of the pixel circuits of the OLED panel shown in FIG. 2A.

FIG. 2A schematically illustrates the driving display of the organic light-emitting diode (OLED) panel using the reset voltage control circuit of the present disclosure. The OLED panel 20 has a plurality of pixel circuits 21 arranged in a matrix form. The OLED panel 20 may be driven to display at least one frame 23. Each frame 23 has a plurality of pixels 231. Each pixel 231 has a gray-scale value representing brightness. FIG. 2B is a schematic diagram illustrating the connection of one of the pixel circuits 21. Please refer to FIG. 2A and FIG. 2B at the same time. The pixel circuit 21 of the OLED panel 20 displays the pixels 231 of the corresponding frame 23 in a frame period according to the driving of the control signal. That is, the pixel circuit 21 is driven by the control signal to display the corresponding pixels 231 according to the input data representing the frame 23 and, when the OLED panel 20 displays a frame 23, the reset voltage control circuit 10 provides the OLED panel 20 with at least one reset voltage Vint corresponding to the displayed frame 23, and the OLED panel 20 is performed with the OLED on state reset according to the reset voltage Vint, wherein the reset voltage Vint provided by the reset voltage control circuit 10 is dynamically generated based on the plurality of pixels 231 of the frame 23.

Figure 3A:
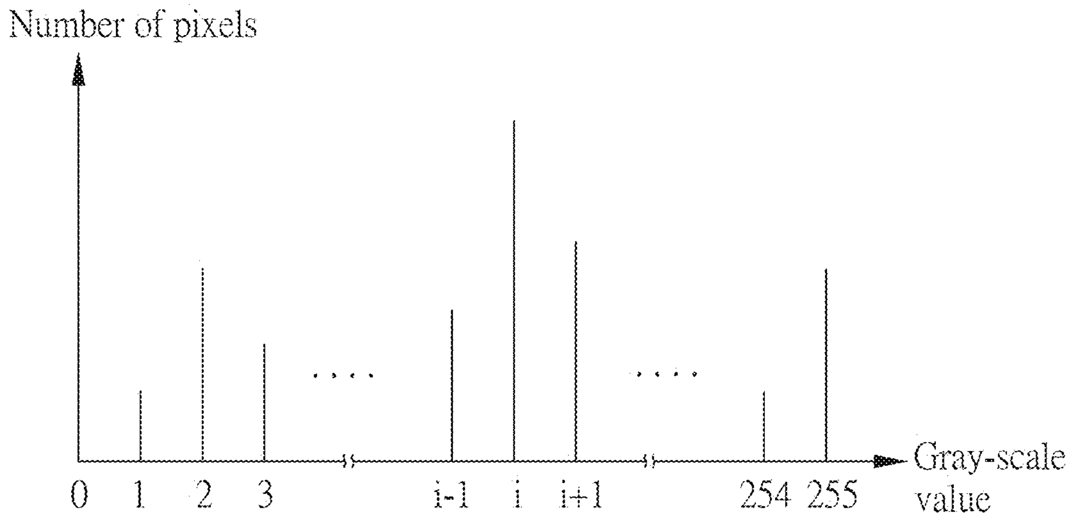
FIG. 3A is a schematic diagram illustrating the control of the reset voltage control circuit according to the first embodiment of the present disclosure.

In the first embodiment of the reset voltage control circuit 10 of the present disclosure, the reset voltage Vint is dynamically generated based on the brightness information of the frame 23; that is, the reset voltage control circuit 10 performs voltage control by analyzing the brightness of the frame 23 so as to dynamically adjust the reset voltage Vint thereby achieving the purpose of reducing power consumption. In one example, based on the plurality of pixels 231 in a displayed frame 23, the reset voltage control circuit 10 calculates the number of pixels 231 corresponding to each gray-scale value so as to select the gray-scale value corresponding to the largest number of pixels 231 to generate the reset voltage Vint. FIG. 3A is a schematic diagram illustrating the control of the reset voltage control circuit 10 according to the first embodiment of the present disclosure. Assuming that the gray-scale value for the OLED panel driving and displaying is 0~255 and the number of pixels 231 corresponding to the gray-scale value of i is the largest, the gray-scale value of i is thus selected to generate the reset voltage Vint. The magnitude of the generated reset voltage Vint is proportional to the selected gray-scale value, that is, the higher the brightness, the larger the reset voltage Vint.

Figure 3B:
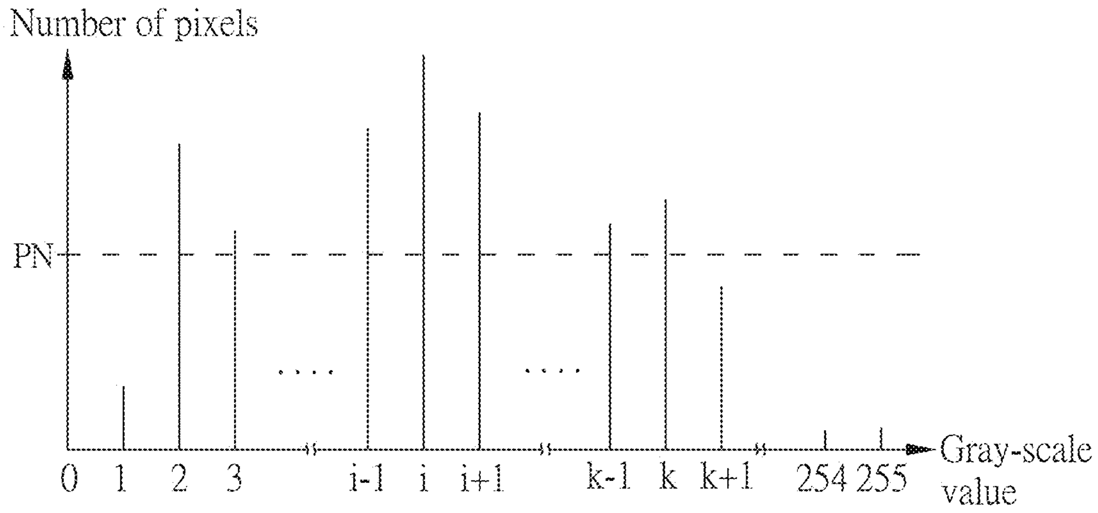
FIG. 3B is another schematic diagram illustrating the control of the reset voltage control circuit according to the first embodiment of the present disclosure.

In another example, based on a plurality of pixels 231 in a displayed frame 23, the reset voltage control circuit 10 finds the maximum gray-scale value among the corresponding gray-scale values that exceed a first predetermined value PN, and uses this maximum gray-scale value to generate the reset voltage Vint. FIG. 3B is another schematic diagram illustrating the control of the reset voltage control circuit 10 in this embodiment. It is assumed that the gray-scale value for the OLED panel driving and displaying is 0~255, and the corresponding gray-scale values exceeding the first predetermined value PN are 2, 3, . . . i−1, i, i+1, . . . k−1, k, . . . , where the gray-scale value of k is the maximum gray-scale value exceeding the first predetermined value PN, so that the gray-scale value of k is selected to generate the reset voltage Vint. The magnitude of the generated reset voltage Vint is proportional to the maximum gray-scale value, that is, the higher the brightness, the larger the reset voltage Vint.

In yet another example, based on the corresponding gray-scale values of a plurality of pixels 231 in a displayed frame 23, the reset voltage control circuit 10 calculates the average gray-scale value AG of the plurality of pixels 231. It is assumed that the gray-scale value for the OLED panel driving and displaying is 0~255, and the average gray-scale value AG is (0×G0+1×G1+2×G2+3×G3+ . . . +254×G254+255×G255)/(G0+G1+G2+G3+ . . . +G254+G255), where G0~G255 represent the numbers of pixels 231 with gray-scale values of 0~255, respectively, and the average gray-scale value AG is used to generate the reset voltage Vint. The magnitude of the generated reset voltage Vint is proportional to the average gray-scale value AG, that is, the higher the brightness, the larger the reset voltage Vint.

In the first embodiment, based on the current magnitude and the gate-drain voltage Vgd reflected by the brightness information of the displayed frame 23, the reset voltage control circuit 10 adjusts the voltage signal of the reset voltage Vint when the OLED completes light emitting and enters the OLED on state reset. When there is a large amount of charges generated and accumulated on the drain, the reset voltage Vint is adjusted up to enhance the release of accumulated charges on the drain. On the contrary, when there is a small amount of charges generated and accumulated on the drain, the reset voltage Vint is adjusted down to reduce power consumption. By dynamically adjusting the OLED on state reset voltage according to the brightness information of the displayed frame 23, the purpose of reducing power consumption can be achieved.

Figure 4:
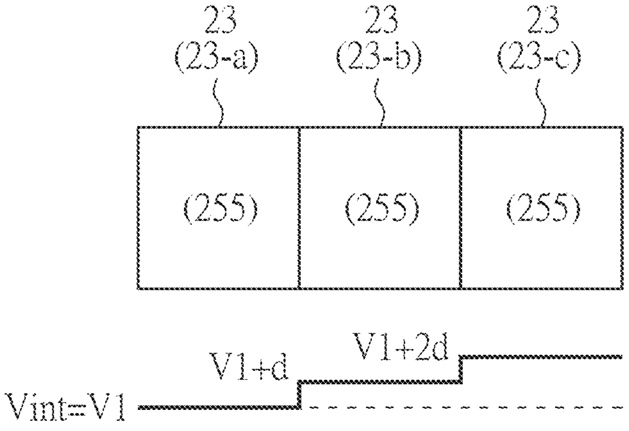
FIG. 4 is a schematic diagram illustrating the control of the reset voltage control circuit according to the second embodiment of the present disclosure.

In the second embodiment of the reset voltage control circuit 10 of the present disclosure, the reset voltage Vint is dynamically generated based on the brightness information and timing information of the frame 23. That is, the reset voltage control circuit 10 performs voltage control by analyzing the brightness of the frame 23 and based on the time progress of the frame display to dynamically adjust the reset voltage Vint, thereby achieving the purpose of reducing power consumption. FIG. 4 is a schematic diagram illustrating the control of the reset voltage control circuit 10 according to the second embodiment of the present disclosure. In this embodiment, for a frame 23, in addition to generating the reset voltage Vint according to the first embodiment, when successively displaying a plurality of frames 23 with the same reset voltage Vint, the reset voltage control circuit 10 may gradually adjust up the reset voltages Vint of the frames 23 according to the time progress of the frame display. For example, as shown in FIG. 4, assuming that three successively displayed frames 23-*a*, 23-*b*, and 23-*c* have the same average gray-scale value of 255 (and also have the same reset voltage Vint), when the reset voltage Vint of frame 23-*a* is V1, the reset voltage Vint of frame 23-*b* is adjusted to V1+d, and the reset voltage Vint of frame 23-*c* is adjusted to V1+2d.

In this embodiment, based on the current magnitude and the gate-drain voltage Vgd reflected by the brightness information of the frame 23 and, with reference to the display driving time, as the accumulated charges reach a certain amount that results in the hysteresis of the transistor being sufficient to affect the response time of frame 23, the reset voltage control circuit 10 adjusts the voltage signal of the reset voltage Vint to perform the action of the OLED on state reset when the OLED completes light emitting and enters the OLED on state reset. Therefore, when there is a large amount of charges generated and accumulated on the drain, the reset voltage Vint is adjusted up to enhance the release of the accumulated charges on the drain. On the contrary, when there is a small amount of charges generated and accumulated on the drain, the reset voltage Vint is adjusted down to reduce power consumption. By dynamically adjusting the OLED on state reset voltage according to the brightness information and timing information of frame 23, the purpose of reducing power consumption can be achieved.

Figure 5:
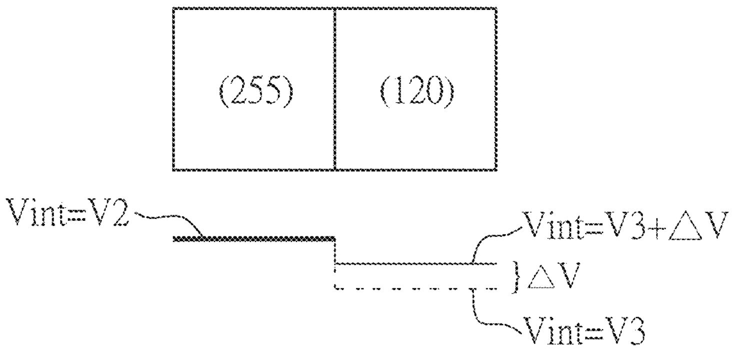
FIG. 5 is a schematic diagram illustrating the control of the reset voltage control circuit according to the third embodiment of the present disclosure.

In the third embodiment of the reset voltage control circuit 10 of the present disclosure, the reset voltage Vint is dynamically generated based on the brightness information and brightness difference of the frame 23. That is, the reset voltage control circuit 10 performs voltage control by analyzing the brightness information of the frame 23 and the brightness difference between two successively displayed frames 23 so as to dynamically adjust the reset voltage Vint, thereby achieving the purpose of reducing power consumption. FIG. 5 is a schematic diagram illustrating the control of the reset voltage control circuit 10 according to the third embodiment of the present disclosure. In this embodiment, for the successively displayed frames 23-*d* and 23-*e*, in addition to generating the reset voltage Vint according to the first embodiment, when the brightness difference between the frame 23-*d* and the frame 23-*e* is greater than a second predetermined value PB, the reset voltage Vint of the frame 23-*e* may be compensated by a voltage compensation value AV. That is, the voltage compensation value AV is added to or subtracted from the reset voltage Vint of the frame 23-*e*.

For example, as shown in FIG. 5, the reset voltage Vint corresponding to frame 23-*d* is V2, and the reset voltage Vint corresponding to the frame 23-*e* is V3. Assuming that the second predetermined value PB is 100, and the brightness Ld (for example, the average gray-scale value) of the frame 23-*d* is 255 and the brightness Le (for example, the average gray-scale value) of the frame 23-*e* is 120, the brightness difference between frame 23-*d* and frame 23-*e* is calculated as: $|Ld-Le|=|255-120|=125$. Because the brightness difference (=125) is greater than the second predetermined value PB (=100), the reset voltage Vint of the frame 23-*e* may be compensated. Moreover, because of Ld>Le, the reset voltage Vint of frame 23-*e* is V3+ΔV. It is noted that, in other embodiments, when Ld<Le, the reset voltage Vint of frame 23-*e* is V3−ΔV.

With this embodiment, the problem of transient afterimages caused by hysteresis phenomenon can be solved. When there is brightness difference between two successively displayed frames 23, it indicates that the transistors in the OLED pixels corresponding to the two successively displayed frames 23 suffer different charge accumulations, and thus, during frame switching, some pixels 231 are prone to be unable to keep up with the brightness changes due to the charge accumulation of transistors, resulting in static afterimages. Therefore, it is necessary to refer to the brightness information of the two successively displayed frames 23 to perform voltage adjustment of the OLED on state reset at the moment when the frame 23 changes, so as to alleviate or obviate the afterimages during frame switching. When there is a large amount of charges generated and accumulated on the drain corresponding to the previous frame 23, the reset voltage Vint is adjusted up to enhance the release of the accumulated charges on the drain. On the contrary, when there is a small amount of charges generated and accumulated on the drain, the reset voltage Vint is adjusted down to reduce power consumption. By dynamically adjusting the OLED on state reset voltage according to the brightness information of the frame 23, the purpose of reducing power consumption can be achieved.

Figure 6:
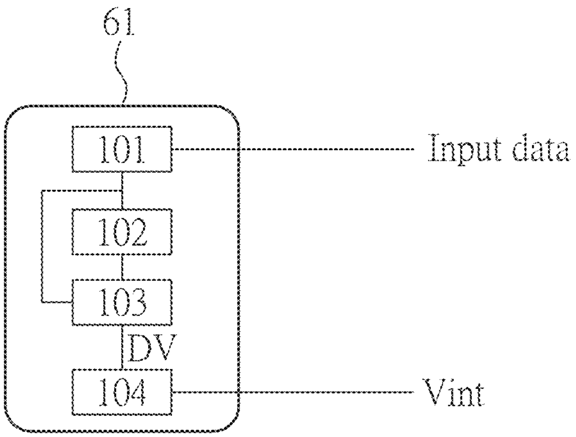
FIG. 6 shows an implementation aspect of the reset voltage control circuit of the present disclosure.

FIG. 6 shows an implementation aspect of the reset voltage control circuit 10 of the present disclosure, wherein the reset voltage control circuit 10 is implemented in a display driver integrated circuit (DDIC) 61, and includes a frame analysis unit 101, a frame latch 102, a dynamic voltage controller 103, and a voltage generator 104. The frame analysis unit 101 receives input data representing the frame 23 to analyze the plurality of pixels 231 of the frame 23 according to the aforementioned embodiments. The frame latch 102 is coupled to the frame analysis unit 101 to latch the input data. The dynamic voltage controller 103 is coupled to the frame analysis unit 101 and the frame latch 102 to perform voltage control according to the input data latched by the frame latch 102 and the analysis result of the frame analysis unit 101, so as to output a dynamic voltage signal DV. The voltage generator 104 then generates the reset voltage Vint based on the dynamic voltage signal DV. In another embodiment, a touch display driver integration (TDDI) chip may be used to replace the display driver integrated circuit 61.

Figure 7:
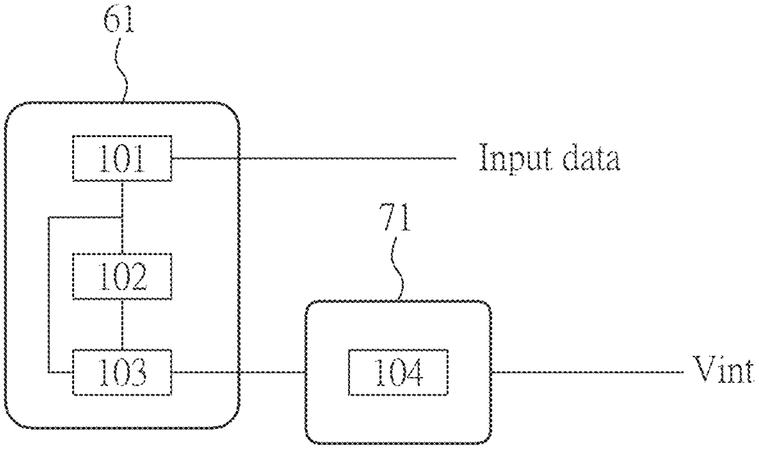
FIG. 7 shows another implementation aspect of the reset voltage control circuit of the present disclosure.

FIG. 7 shows another implementation aspect of the reset voltage control circuit 10 of the present disclosure, which is similar to the implementation aspect of the reset voltage control circuit 10 of FIG. 6, except that the reset voltage control circuit 10 is implemented in a display driver integrated circuit 61 and a power integrated circuit (Power IC) 71 disposed outside the display driver integrated circuit 61, wherein the frame analysis unit 101, the frame latch 102, and the dynamic voltage controller 103 are arranged in the display driver integrated circuit 61, and the voltage generator 104 is arranged in the power integrated circuit 71, thereby making full use of the voltage generation function of the power integrated circuit 71 so as to effectively reduce hardware costs.

The aforementioned specific embodiments should be construed as merely illustrative, and not limiting the rest of the present disclosure in any way.

The invention claimed is:

1. A reset voltage control circuit for providing at least one reset voltage to an organic light-emitting diode panel, the organic light-emitting diode panel being driven to display at least one frame, each frame having a plurality of pixels and corresponding to a reset voltage, the organic light-emitting diode panel performing an organic light-emitting diode on state reset according to the reset voltage, wherein the reset voltage is dynamically generated according to the plurality of pixels of the frame, wherein the reset voltage is dynamically generated according to brightness information of the frame, and wherein each pixel has a gray-scale value and, based on the plurality of pixels of the frame, the reset voltage control circuit calculates a number of pixels corresponding to each gray-scale value so as to select the gray-scale value corresponding to a largest number of pixels to generate the reset voltage.

2. The reset voltage control circuit as claimed in claim 1, wherein, when successively displaying a plurality of frames with a same reset voltage, the reset voltage control circuit gradually adjusts up the reset voltages corresponding to the plurality of frames according to time progress of frame display.

3. The reset voltage control circuit as claimed in claim 1, wherein, for a first frame and a second frame that are successively displayed, when a brightness difference between the first frame and the second frame is greater than a second predetermined value, the reset voltage corresponding to the second frame is compensated by a voltage compensation value.

4. The reset voltage control circuit as claimed in claim 1, wherein the reset voltage control circuit is implemented in a display driver integrated circuit that receives input data representing the frame so as to analyze the plurality of pixels of the frame, and includes:

a frame latch for latching the input data;

a dynamic voltage controller coupled to the frame latch for performing voltage control based on the input data latched by the frame latch and an analysis result of analyzing the plurality of pixels of the frame so as to output a dynamic voltage signal; and a voltage generator for generating the reset voltage according to the dynamic voltage signal.

5. The reset voltage control circuit as claimed in claim 1, wherein the reset voltage control circuit is implemented in a display driver integrated circuit and a power integrated circuit disposed outside the display driver integrated circuit, and wherein the display driver integrated circuit receives input data representing the frame so as to analyze the plurality of pixels of the frame, and includes a frame latch for latching the input data, and a dynamic voltage controller coupled to the frame latch for performing voltage control based on the input data latched by the frame latch and an analysis result of analyzing the plurality of pixels of the frame so as to output a dynamic voltage signal, and wherein the power integrated circuit includes a voltage generator for generating the reset voltage according to the dynamic voltage signal.

6. A reset voltage control circuit for providing at least one reset voltage to an organic light-emitting diode panel, the organic light-emitting diode panel being driven to display at least one frame, each frame having a plurality of pixels and corresponding to a reset voltage, the organic light-emitting diode panel performing an organic light-emitting diode on state reset according to the reset voltage, wherein the reset voltage is dynamically generated according to the plurality of pixels of the frame, and wherein the reset voltage is dynamically generated according to brightness information of the frame, and wherein each pixel has a gray-scale value and, based on the plurality of pixels of the frame, the reset voltage control circuit finds a maximum gray-scale value among the corresponding gray-scale values that exceed a first predetermined value, and uses the maximum gray-scale value to generate the reset voltage.

7. The reset voltage control circuit as claimed in claim 6, wherein, when successively displaying a plurality of frames with a same reset voltage, the reset voltage control circuit gradually adjusts up the reset voltages corresponding to the plurality of frames according to time progress of frame display.

8. The reset voltage control circuit as claimed in claim 6, wherein, for a first frame and a second frame that are successively displayed, when a brightness difference between the first frame and the second frame is greater than a second predetermined value, the reset voltage corresponding to the second frame is compensated by a voltage compensation value.

9. The reset voltage control circuit as claimed in claim 6, wherein the reset voltage control circuit is implemented in a display driver integrated circuit that receives input data representing the frame so as to analyze the plurality of pixels of the frame, and includes:

a frame latch for latching the input data;

a dynamic voltage controller coupled to the frame latch for performing voltage control based on the input data latched by the frame latch and an analysis result of analyzing the plurality of pixels of the frame so as to output a dynamic voltage signal; and a voltage generator for generating the reset voltage according to the dynamic voltage signal.

10. The reset voltage control circuit as claimed in claim 6, wherein the reset voltage control circuit is implemented in a display driver integrated circuit and a power integrated circuit disposed outside the display driver integrated circuit, wherein the display driver integrated circuit receives input data representing the frame so as to analyze the plurality of pixels of the frame, and includes a frame latch for latching the input data, and a dynamic voltage controller coupled to the frame latch for performing voltage control based on the input data latched by the frame latch and an analysis result of analyzing the plurality of pixels of the frame so as to output a dynamic voltage signal, and wherein the power integrated circuit includes a voltage generator for generating the reset voltage according to the dynamic voltage signal.

11. A reset voltage control circuit for providing at least one reset voltage to an organic light-emitting diode panel, the organic light-emitting diode panel being driven to display at least one frame, each frame having a plurality of pixels and corresponding to a reset voltage, the organic light-emitting diode panel performing an organic light-emitting diode on state reset according to the reset voltage, wherein the reset voltage is dynamically generated according to the plurality of pixels of the frame, and wherein the reset voltage is dynamically generated according to brightness information of the frame, and wherein each pixel has a gray-scale value and, based on the corresponding gray-scale values of the plurality of pixels of the frame, the reset voltage control circuit calculates an average gray-scale value of the plurality of pixels, and uses the average gray-scale value to generate the reset voltage.

12. The reset voltage control circuit as claimed in claim 11, wherein, when successively displaying a plurality of frames with a same reset voltage, the reset voltage control circuit gradually adjusts up the reset voltages corresponding to the plurality of frames according to time progress of frame display.

13. The reset voltage control circuit as claimed in claim 11, wherein, for a first frame and a second frame that are successively displayed, when a brightness difference between the first frame and the second frame is greater than a second predetermined value, the reset voltage corresponding to the second frame is compensated by a voltage compensation value.

14. The reset voltage control circuit as claimed in claim 11, wherein the reset voltage control circuit is implemented in a display driver integrated circuit that receives input data representing the frame so as to analyze the plurality of pixels of the frame and includes:

a frame latch for latching the input data;

a dynamic voltage controller coupled to the frame latch for performing voltage control based on the input data latched by the frame latch and an analysis result of analyzing the plurality of pixels of the frame so as to output a dynamic voltage signal; and a voltage generator for generating the reset voltage according to the dynamic voltage signal.

15. The reset voltage control circuit as claimed in claim 11, wherein the reset voltage control circuit is implemented in a display driver integrated circuit and a power integrated circuit disposed outside the display driver integrated circuit, wherein the display driver integrated circuit receives input data representing the frame so as to analyze the plurality of pixels of the frame, and includes a frame latch for latching the input data, and a dynamic voltage controller coupled to the frame latch for performing voltage control based on the input data latched by the frame latch and an analysis result of analyzing the plurality of pixels of the frame so as to output a dynamic voltage signal, and wherein the power integrated circuit includes a voltage generator for generating the reset voltage according to the dynamic voltage signal.

* * * * *